Nov. 28, 1967  D. KANE  3,355,109
MOBILE IRRIGATION DEVICES WITH SWIVELLY ADJUSTABLE WHEELS
Filed Aug. 4, 1965  6 Sheets-Sheet 1
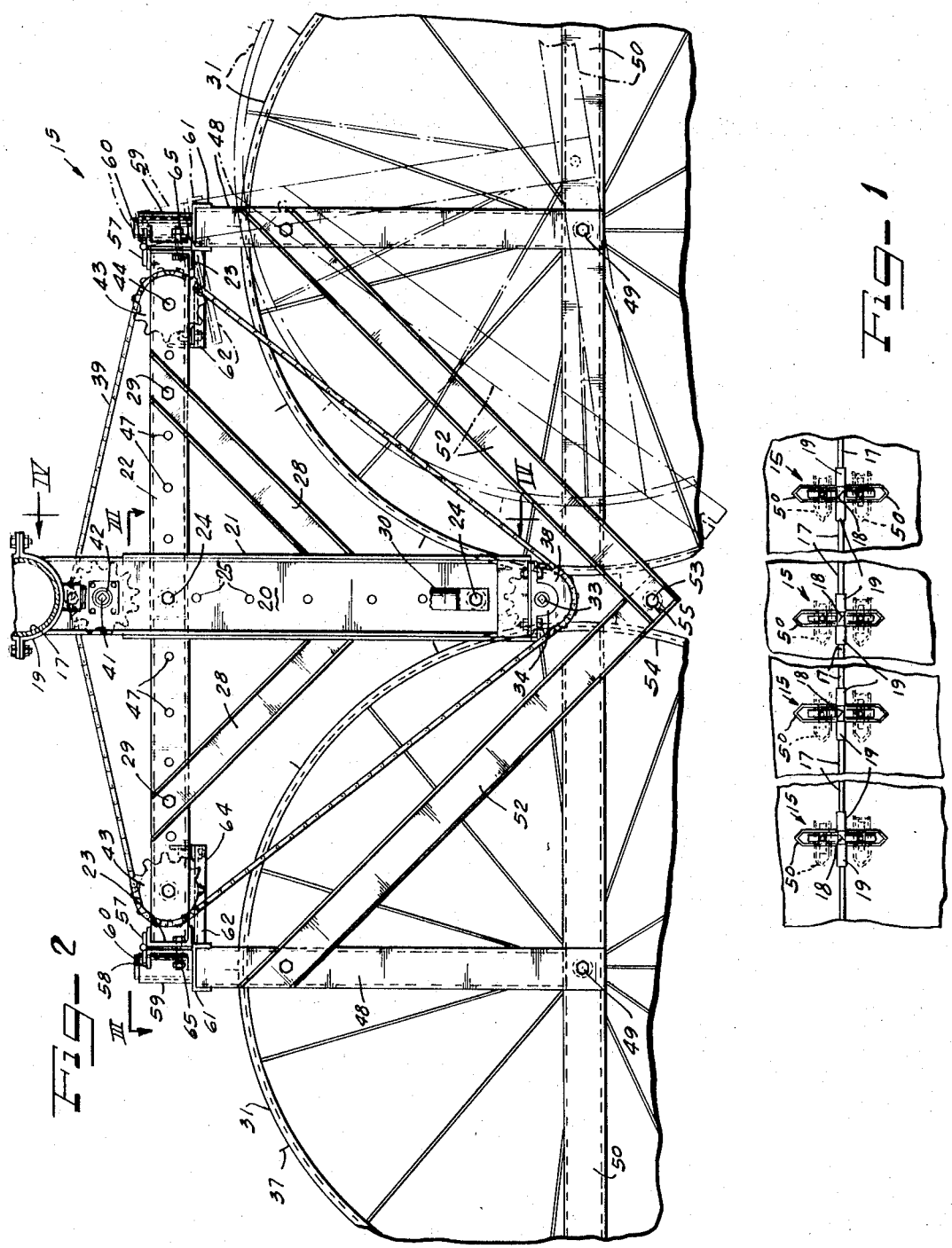
INVENTOR.
DAVID KANE
ATTORNEYS

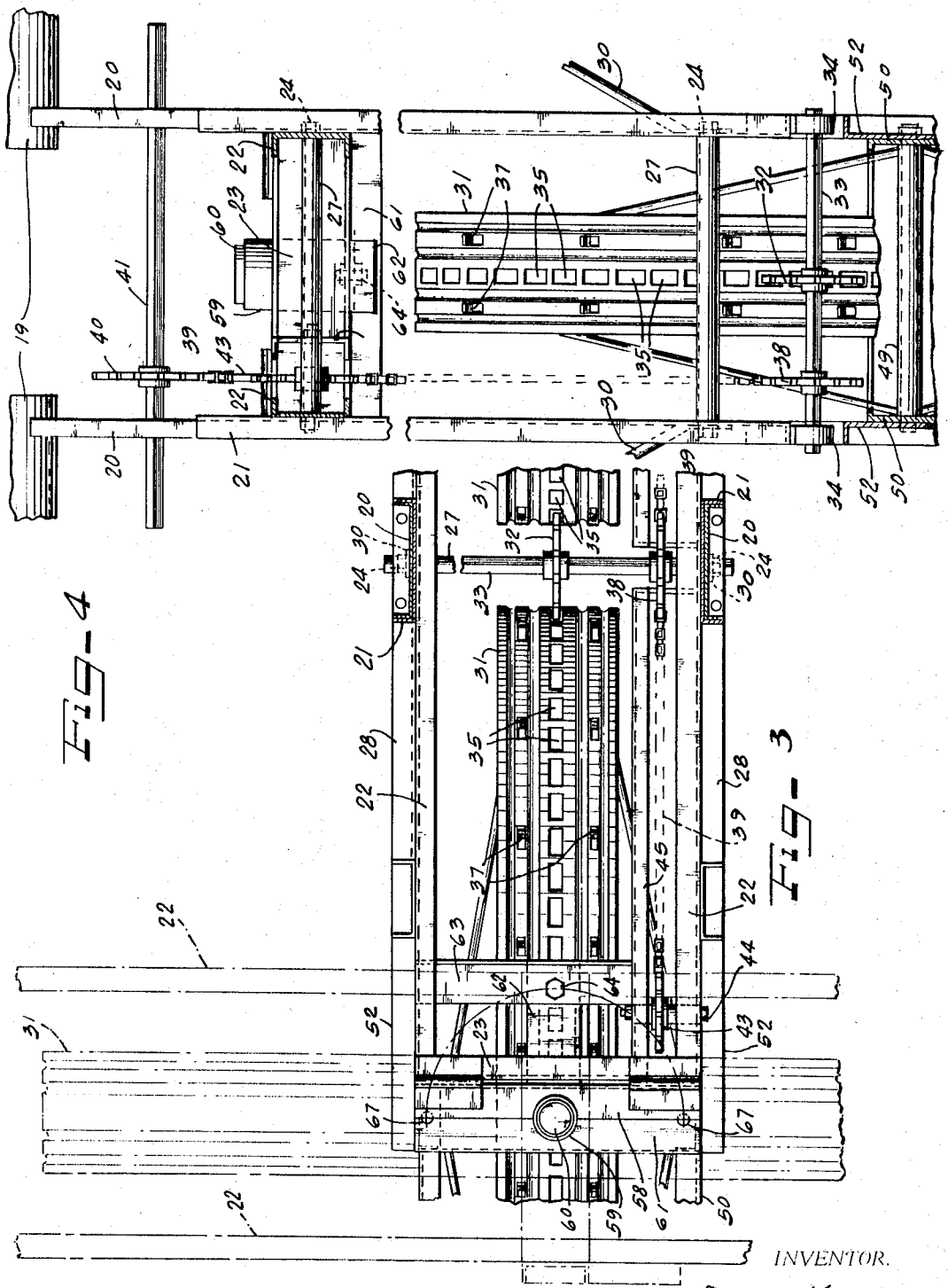

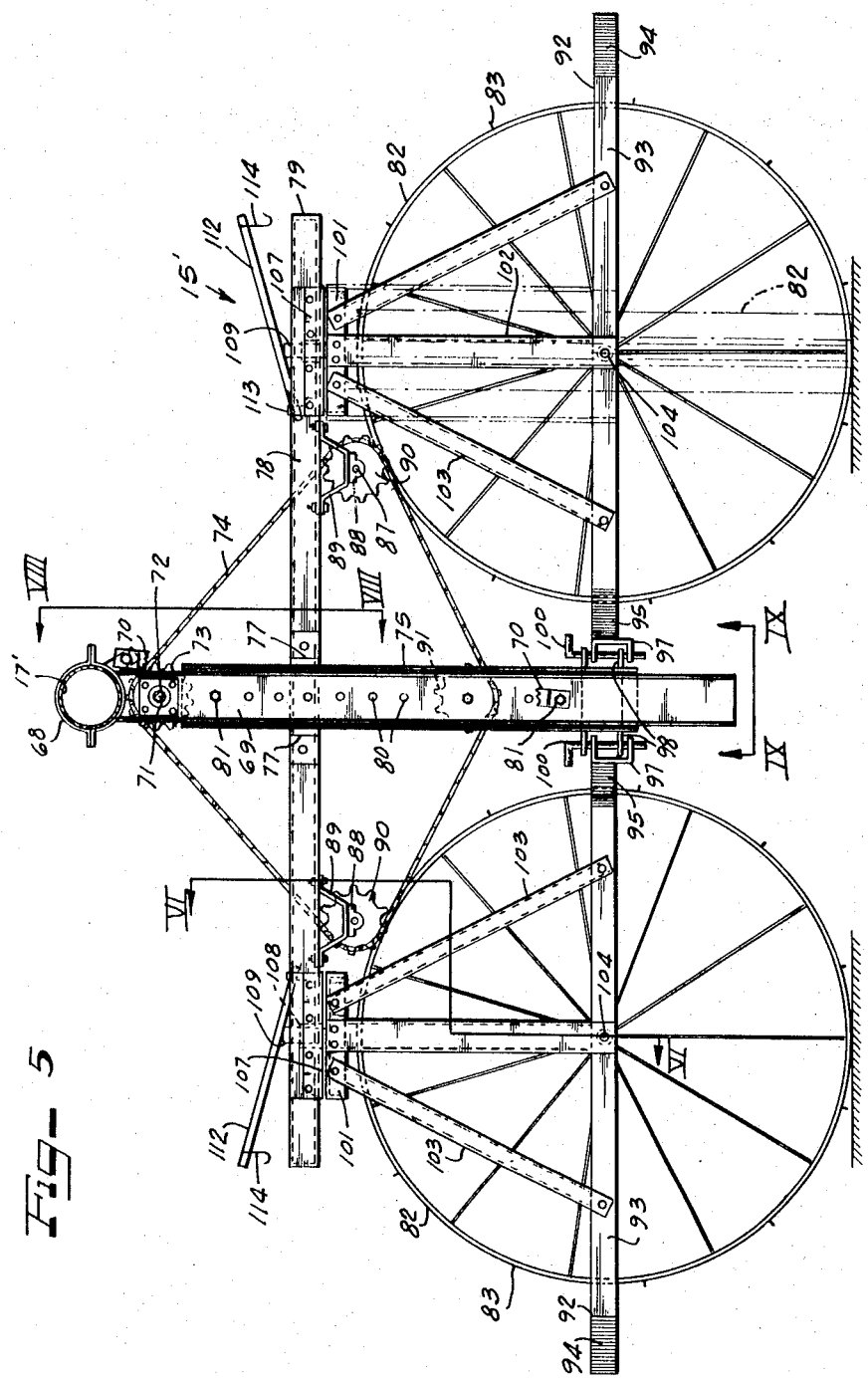

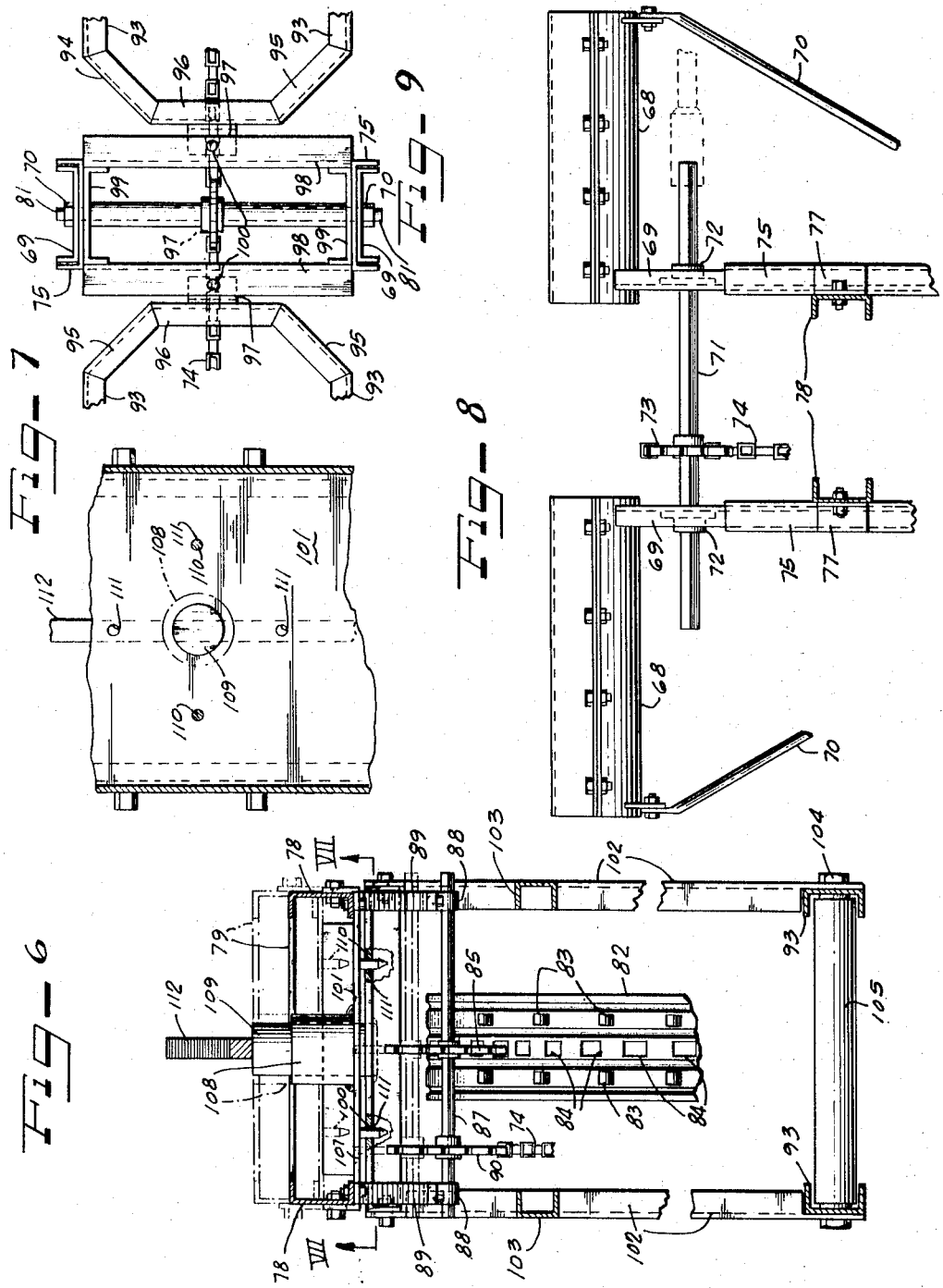

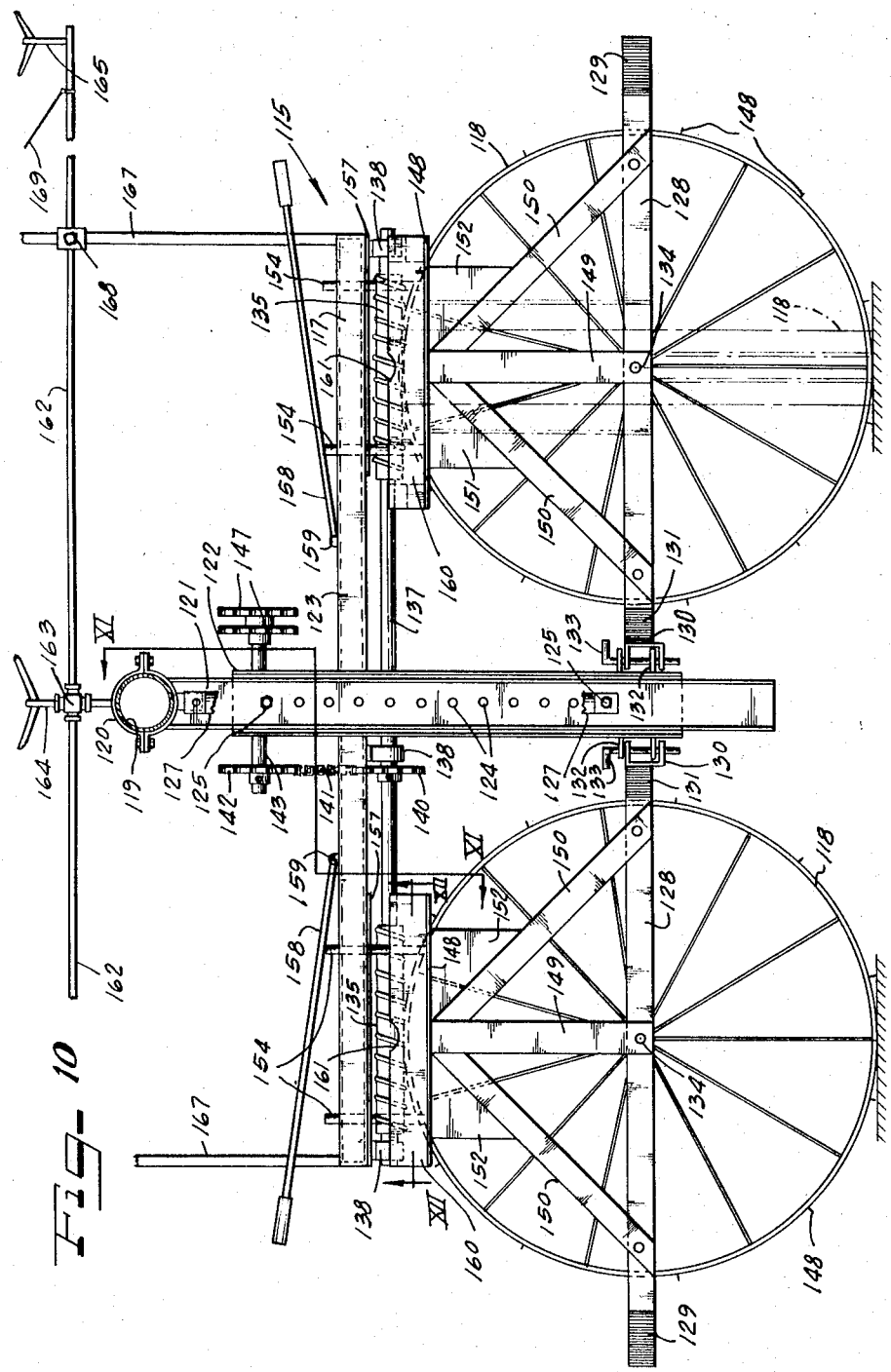

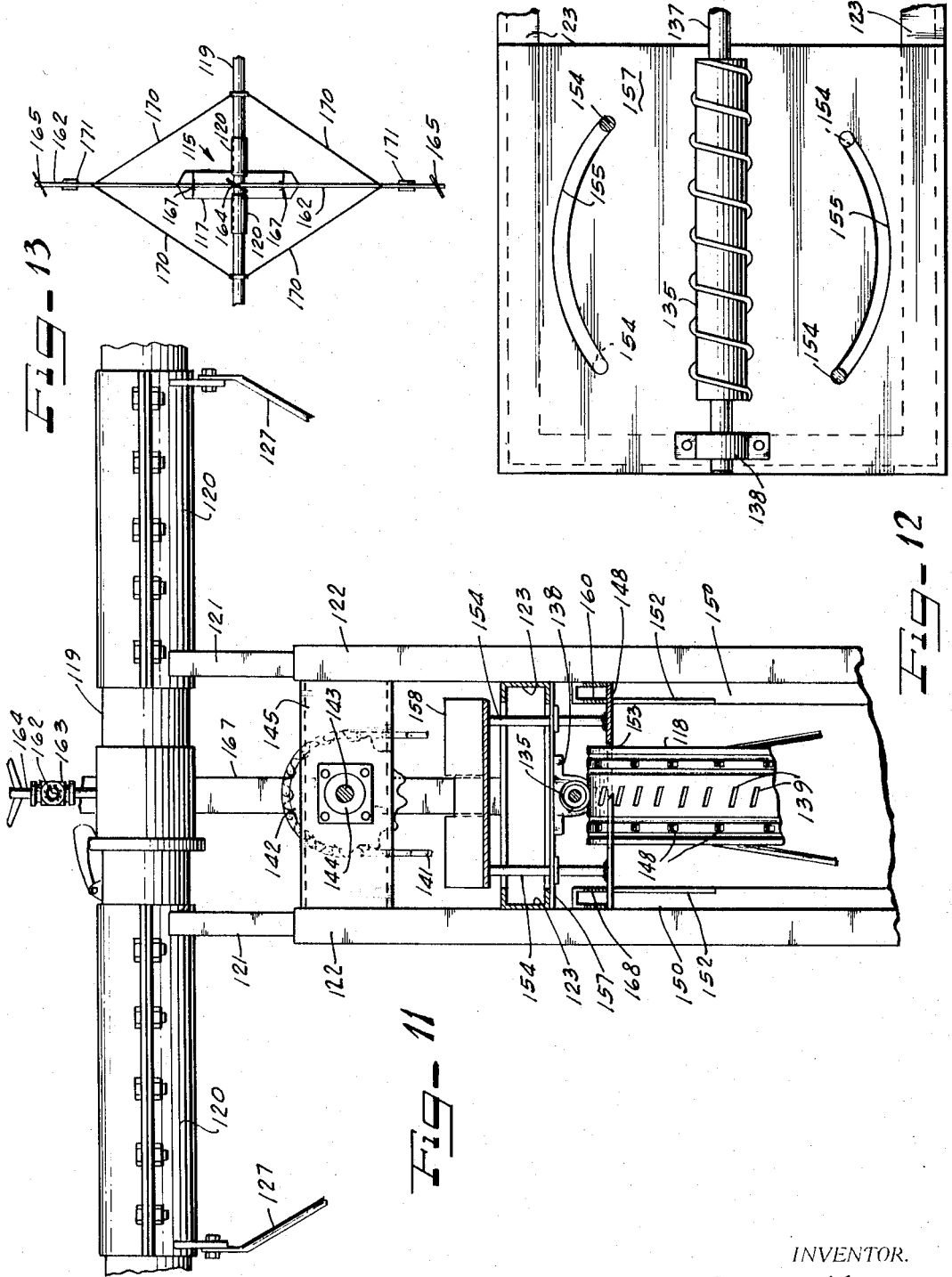

United States Patent Office 3,355,109
Patented Nov. 28, 1967

3,355,109
MOBILE IRRIGATION DEVICES WITH SWIVELLY ADJUSTABLE WHEELS
David Kane, 5036 Roosevelt Road,
San Antonio, Tex. 78214
Filed Aug. 4, 1965, Ser. No. 477,229
17 Claims. (Cl. 239—213)

ABSTRACT OF THE DISCLOSURE

A mobile irrigation device has a main frame and supporting wheels carried by subframes which are swively connected to the main frame for orientation of the wheels to transport on irrigation pipe on the main frame selectively either in a direction normal to its axis or in a direction along its axis. Driving means for the wheels are separable by limited relative movement of the subframe structure in addition to the swivelling movement.

---

This invention relates to improvements in mobile irrigation devices of the type in which a series of wheeled carriage units supports a substantial length of water pipe carrying sprinkler heads for applying irrigation water to a field planted to a desired crop and over which the wheeled irrigation system is progressively advanced in the course of irrigating the field.

After the mobile irrigation system has traversed a field in an irrigation run, it may be desirable to transfer the system to another field located generally in the direction of the axis of the irrigation conduit. It is therefore desirable to have the running wheels of the mobile units turnable so that the assembly or system can be run lengthwise of the pipe to the new location.

It is therefore an important object of the present invention to provide new and improved means in mobile irrigation devices for swively orienting the running wheels thereof.

It is another object of the invention to provide new and improved means for adjustably orienting the running wheels of mobile irrigation units both as to direction of travel and with respect to driving means for the wheels.

A further object of the invention is to provide new and improved wheel mounting and adjusting means for mobile irrigation units.

Still another object of the invention is to provide means providing for slowly paced irrigation running of mobile irrigation units and for rapid running of such units with a supported irrigation pipe from one location to another.

A still further object of the invention is to provide new and improved, simple and rugged swively adjustable wheel means for irrigation units.

It is also an object of the invention to improve the area coverage of mobile irrigation apparatus to eliminate drag lines.

Other objects, features and advantages of the present invention will be readily apparent from the following detailed description of certain preferred embodiments thereof taken in conjunction with the accompanying drawings, in which:

FIGURE 1 is a fragmentary schematic plan view of an irrigation system employing mobile transporting units embodying features of the invention.

FIGURE 2 is a fragmentary side elevational view of one of the mobile devices or units.

FIGURE 3 is a sectional top plan view taken substantially on the line III—III of FIGURE 2.

FIGURE 4 is a vertical sectional elevational detail view taken substantially on the line IV—IV of FIGURE 2.

FIGURE 5 is a side elevational view of a modified unit.

FIGURE 6 is a fragmental enlarged sectional elevational detail view taken substantially on the line VI—VI of FIGURE 5.

FIGURE 7 is a fragmentary bottom sectional plan view, taken on the line VII—VII of FIGURE 6.

FIGURE 8 is an enlarged fragmentary sectional elevational detail view taken substantially on the line VIII—VIII of FIGURE 5.

FIGURE 9 is a fragmentary bottom plan view taken substantially on line IX—IX of FIGURE 5.

FIGURE 10 is a side elevational view of still another modified unit embodying the principles of the present invention.

FIGURE 11 is an enlarged fragmentary sectional elevational view taken substantially on the line XI—XI of FIGURE 10.

FIGURE 12 is a fragmentary bottom plan view taken substantially on the line XII—XII of FIGURE 10.

FIGURE 13 is a schematic illustration showing the outrigger irrigation extension pipe arrangement.

With reference to FIGURE 1, a representative sprinkler irrigation system is depicted schematically, providing a set of as many as needed of two-wheeled mobile units 15 located in spaced parallel relation at suitable intervals in supporting relation along the length of a water pipe 17. Normally the mobile units 15 are oriented to transport the water pipe 17 along an axis of movement transverse to the length of the pipe whereby to traverse a field during irrigation with water from the pipe distributed through respective sprinkler heads 18 desirably extending upwardly from the pipe at each of the mobile units and more particularly between aligned separable pipe-supporting tubular clamps 19 supported to project to respectively opposite sides of the associated wheel unit.

By preference, the pipe clamps 19 are mounted for vertical adjustment so as to vary the height of the pipe 17 to clear crops of various heights. For this purpose, each of the clamps 19 is mounted adjacent to its inner end on a vertically extending bar 20 (FIGS. 2, 3 and 4) which is vertically adjustably telescoped in an outwardly opening vertical channel bar 21 forming a rigid part of a main, upper frame comprising a horizontally spaced parallel longitudinally coextensive pair of frame bars 22 rigidly connected together in a quadrangular framework by respective end cross bars 23. Securement of the vertical supporting bars 21 is to the outer sides of the main frame bars 22 midway the length of the main frame and with upper end portions of the bars 21 extending only a limited distance above the main frame bars, with major length of the supporting bars 21 extending downwardly below the main frame bar. Means for adjustably securing the bars 20 and the supporting bars 21 comprise vertically spaced bolts 24 extending through matching vertical series of adjustment holes 25 in the telescoped bars, with respective spacer tubes 27 mounted on the bolts and abutting the inner faces of the main frame bars 22 for the upper bolt and the inner faces of the vertical frame bars 21 for the lower bolt.

To facilitate assembly, and interchangeability, the vertical adjustment guide frame bars 21 may be detachably secured to the main frame bars 22 as by means of the upper of the bolts 24, and by means of respective pairs of diagonal brace bars 28 which at their lower ends are fixedly secured as by means of welding to the respective opposite flanges of the vertical bars and extend obliquely upwardly divergently and are secured at their upper end portions as by means of respective bolts 29 to the main frame bars 22. Stability of support for the respective clamp head assemblies 19 is afforded by diagonal brace bars 30 which at their lower end portions are secured as by means of the lower bolt 24 to the lower end portion of the associated vertical adjustment bar 20 and at their upper end portions are secured to the outer end portions of the clamp assemblies. Through this arrangement, a stable, thoroughly integrated assembly of the clamp-supporting frame and the main frame is effected.

Means for driving wheels 31 of the unit 15 comprise a cog wheel 32 mounted on a shaft 33 journaled in and supported by pillow block bearings 34 mounted on the lower ends of the frame bars 21 and at a suitable height for driving projection of the cogs into cog holes 35 disposed in circumferential series centrally in the tread. Each of the tires providing such treads is also equipped with suitable traction lugs 37.

For driving the cog wheel 32, the shaft 33 is provided with a sprocket wheel 38 over which is trained an endless driving chain 39 of the sprocket or link type. This driving chain is trained over and driven by a driving sprocket 40 corotatable with a drive shaft 41 which extends through the upper end portions of the clamp-supporting bars 20, as close as practicable under the clamps 19 and is journaled in bearings 42 carried by the bars. All of the drive shafts 41 of the several mobile units 15 in the system are coupled for unison rotation, with power being derived from a suitable source such as a motor (not shown) carried by one of the mobile units.

For maintaining the drive chain 39 tensioned, it is trained over respective idler sprockets 43 mounted adjacent to the opposite ends of the main frame. To accommodate vertical adjustments of the saddle clamp carrying bars 20, and thereby of the driving sprocket 40 and the driveshaft 41, the idler sprockets 43 are adapted to be adjustably positioned longitudinally of the main frame. For this purpose the chain and driving sprockets are mounted adjacent to one side of the frame, whereby the idler sprockets 43 are adapted to be rotatably carried by short respective shafts 44 supported by the adjacent longitudinal main frame bar 22 and a shaft-supporting bar 45 suitably spaced inwardly and secured at its opposite ends rigidly with the main frame and defining with the bar 22 a sprocket and chain accommodating elongated space. Within this space the idler sprocket 43, in each instance, is longitudinally adjustably mountable, as permitted by longitudinal series of aligned sprocket shaft holes 47. By suitably selecting the shaft mounting holes 47 proper tensioning of the chain 39 for any permitted vertical adjustment of the pipe-supporting frame structure is attained.

Means are provided for releasably maintaining each of the supporting wheels 31 normally in the same plane longitudinally of the main frame and thus oriented to transport the device along an axis of movement transverse to the length of the pipe 17, with the tires of the wheels disposed in driving association with the cog wheel 32. Such means are also constructed and arranged to enable orientation of the wheels in planes parallel to one another and to the length of the pipe 17, as shown in dashed line in FIGURES 1 and 3, to enable transportation of the pipe lengthwise thereof. To this end, each of the wheels 31 is rotatably mounted on a sub-frame comprising an inverted substantially U-shaped portion or fork 48 straddling the associated wheel, with the lower end portions of the fork arms providing a rotatable mount for the wheels through an axle 49. Also attached to the lower end portions of the fork arms, in each sub-frame is a horizontal spreader frame 50 having a generally spear-shaped closed spreader nose 51 at its outer or advancing end and with side bars which are secured at their inner ends to respective diagonal coupling bars 52 extending from upper end portions attached to the upper end portions of the fork arms downwardly and inwardly past the spreader bars and with the respective lower ends below the pillow blocks 34 for lapping engagement with the corresponding coupling bars of the other wheel sub-frame. During normal irrigation transportation of the water pipe 17, the coupling bars 52 of the two wheel sub-frames are secured together releasably as by means of a bolt 53, with a spacer sleeve 54 about the bolt providing an abutment against which the coupling bars are clamped by tightening of the bolt. To facilitate quick disconnection of the coupling bars, one of them in each engageable set has a bolt-releasing slot 55 running out at the end of the bar. Thereby, in the inline coupled relationship of the wheel frames, the tires of the wheels are maintained in driving relation to the cog wheel 32. By uncoupling of the wheel frames, they are adapted to automatically disconnect the wheels from the driving cog wheel.

In order to facilitate disconnection of the wheels from the driving cog wheel and to enable turning of the wheels, a hinged and swivel connection of the respective wheel frames with the respective opposite ends of the main frame is provided. Means for this purpose comprise respective hinges 57 which are secured to the tops of the cross bars 23 of the main frame to the tops of respective head bars 58 disposed in back-to-back relation to the cross bars and rigidly carrying centrally thereon respective vertical tubular swivel bearings 59 into which project upwardly extending respective swivel pintles 60 projecting rigidly upwardly centrally from respective cross bars 61 at the tops of the forks 48.

In the in-line, coupled relation of the wheel frames, the wheel frames are locked to the main frame against either hinged movement or swivel movement, and against separation of the coupling arms 52, by means comprising a locking arm extending rigidly inwardly centrally from the cross bar 61 into underlying relation to a transverse locking bar 63 rigid with the main frame side bars 22. Releasable attachment of the locking arm 62 to the locking bar 63 is effected as by means of a bolt 64. Upon removing the locking bolt 64, and releasing the coupling bolt 53, outward hinged swinging movement of the wheel frames is permitted as indicated in dot-dash outline in FIGURE 2. The limit upon such hinging movement is afforded by a suitable stop means such as provided by respective limit bolts 65 connected to and between the cross bars 23 and the head bars 58. Such outswinging of the wheel frames will be to a sufficient extent to clear the fork cross bars 61 past the chain 39 and the idler sprockets 43 as the frames are swiveled to bring the wheels into parallel relation.

For maintaining the wheels in the parallel relation, the wheel frame cross bars 61 are secured to the locking bar 63 of the main frame. For this purpose the cross bars 61 are provided with respective bolt holes 67 which are located on a suitable radius from the axis of the swivel pintle 60 to register with and receive the locking bolt 64, as indicated by the dot-dash radius line in FIGURE 3.

In FIGURES 5-9, deails of a mobile irrigation device are depicted embodying the principles of this invention and providing certain features which, while adding or substituting some structural elements affords certain advantages of convenience and ease of swiveling orientation of the wheels of the unit. Similarly as in the form of the invention already described, a suitable plurality of the devices 15' located at spaced intervals along the irrigation pipe 17' supports the pipe for irrigation travel over a planted field, and also enables the pipe to be transported in the direction of its length.

For supporting the pipe 17', tubular saddle clamps 68 are mounted in axially aligned spaced relation and have their inner, adjacent end portions secured to the upper ends of respective vertically adjustable riser bars 69, while respective diagonal brace bars 70 are attached to the undersides of the outer end portions of the clamps and have their lower ends suitable attached to the associated bars 69. At their upper ends, the braces 70 are offset from a vertical plane through the axis of the clamps 68 to afford clearance for coupling extensions of a drive shaft assembly including a shaft 71 by which the device 15' is adapted to be driven in unison with all of the companion devices in an irrigation system. This shaft 71 is rotatably journaled in respective bearings 72 mounted in coaxial alignment on the head end portions of the riser bars 69 adjacently below the saddle clamps. Carried by the shaft 71 are driving means comprising a sprocket wheel 73 over which is trained a sprocket or link type endless driving chain 74.

Vertically adjustable support for the riser bars 69 is provided by respective guide channel bars 75 secured in upright fixed position as by means of brackets 77 to the midpoints of the outer sides of respective longitudinal side frame bars 78 of an elongated preferably rectangular upper, main frame 79. An upper portion of the supporting and guide bar 75 extends to a suitable height above the main frame 79 while the major extent of such bar, in each instance, extends downwardly below the main frame. By means of a vertical series of equally spaced, respectively alignable bolt holes 80 in the riser bars 59 and the companion supporting bar 75, vertical adjustments of the riser bars are effectively maintained by bolts 81, desirably located adjacent to the upper and lower telescoping portions of the riser bars. The lower of the bolts 81 is also desirably utilized for securing the associated brace bar 70.

Mobile support for the device 15' is provided by a pair of wheels 82, desirably of the metal band tire tread type, having suitable traction lugs 83 (FIGS. 5 and 6). Although either of the wheels 82 may be driven, both of the wheels are, in this instance, equipped to be driven and for this purpose each of them has a circumferential series of cog apertures 84 centrally in its tread, driving receptive of the cog projections of a cog wheel 85. In this instance, each of the wheels 82 is arranged to be driven by a separate cog wheel 85 mounted on a shaft 87 journaled in pillow block assemblies 88 mounted on respective U-brackets 89 secured to the under sides of the respective side frame bars 78 at each side of the main frame 79. A driving connection with the driving chain 74 is afforded by sprocket wheels 90 corotatively secured to the respective shafts 87 and over which the drive chain 74 is trained. Tensioning of the chain 74 is effected by an idler sprocket 91 adjustably mounted on and between the vertical supporting frame bars 75. Through this arrangement the wheels 82 are driven in unison for transporting the irrigation pipe 17' in an irrigation traverse of a field.

Means are provided for quickly disconnecting the wheels 82 from the driving cog wheels 85 and reorienting the wheels from the aligned transporting relation as shown in full line in FIG. 5 into orientation in parallel planes to the length of the pipe 17', as indicated in dot-dash outline. For this purpose, each of the wheels 82 is rotatably mounted in a sub-frame swivelly connected with the main frame 79. Each of the wheel sub-frames comprises a horizontal wheel journal and spreader frame unit 92 having spaced parallel longitudinal side bars 93 extending at their opposite ends adjacent to the outer and inner perimeter sectors of the associated wheel and joined at their outer ends by a general spearhead shaped spreader nose portion 94.

At the rear ends, the side sub-frame bar 93 are joined by an integral frame yoke comprising converging swivel clearance portions 95 and a cross bar 96 disposed in the in-line orientation of the wheels 82 adjacent to the lower end portions of the vertical frame guide bars 75 whereby to enable releasable coupling of the respective sub-frame thereto. A quick detachable coupling for this purpose comprises a clevis-like bracket 97 secured centrally to and projecting from the cross bar 95 for generally interleaved cooperation with a complementary clevis-like coupling member 98 comprising a channel bar secured at its ends, in each instance, to the vertical frame bars 75, with respective, generally U-shaped mounting and tie bars 99 secured to the backs of the end portions of the opposite coupling bars 98 and to the backs of the frame bars 75 to afford a rigid coupling frame. A coupled relationship of the associated coupling members 97 and 98 is maintained by quick releasable means such as a coupling pin 100 which extends through a line of suitable apertures in the interleaved flanges of the coupling members. This pin effectively retains the associated wheel sub-frame for in-line drivingly connected orientation of the associated wheel, and by simple drawing of the pin 100 a quick disconnection of the coupling enables swiveling of the wheel assembly toward its other useful orientation.

Swiveling connection of each of the wheel sub-frames with the upper, main frame 79 is effected in a manner to enable disconnecting of the separably interengaging driving cog wheel and supporting wheel incident to swiveling movements of the sub-frame relative to the main frame. To this end, each of the wheel sub-frames includes a swiveling frame or bolster structure 101 suitably supported above the associated wheel 82 by means of respective opposite vertical side frame bars 102 and a pair of diagonal brace bars 103 at each side, connected to and between the side frame bars 93 of the horizontal frame 92 and the bolster. In a desirable arrangement, the vertical frame bars 102 are adapted to be secured to the frame bars 93 by means of a bolt 104 about which is mounted a freely rotatable axle sleeve 105 which provides a bearing for the hub of the associated wheel 82.

Support of the main frame 79 on the bolsters 101 is through respective thrust plates 107 attached to the under side of the main frame. To permit swiveling, the thrust plate 107 has an upwardly projecting rigid journal sleeve 108 through which extends rotatably an upwardly projecting central rigid pintle 109 on the bolster 101. Normally the bolster and thrust plate are locked against relatively swiveling by means desirably comprising one or more, herein shown as two, interlock pins 110 rigid with and projecting downwardly from the thrust plate 107 and engageable in interlock socket holes 111. As best seen in FIG. 7, there are two sets of the holes 111 disposed 90° from one another, with one set for locking the frames in the in-line orientation of the wheels and the other set for locking the frames in the parallel orientation of the wheels.

In order to release the locking pins 110 and separate the driving cog wheels from the wheels for swiveling movements of the respective wheel sub-frames, means are provided for selectively raising the main frame 79 from the bolsters 101. For this purpose, each of the thrust plates 107 has mounted thereabove a releasing lever arm 112 pivoted at one end to a connector 113 on the thrust plate 107 and suitably spaced from the pintle 109. From the pivotal anchor 113 the releasing lever 112 extends normally obliquely upwardly and in overlying fulcruming relation to the top of the pintle 109 which projects a substantial distance above the top of the journal sleeve 108. Thereby, by depressing the substantial free handle portion of the lever 112 the adjacent end portion of the main frame 79 is rockably raised sufficiently to clear the interlocked pins 110 from the bolster 101 and the cog wheel 105 from the wheel 82. To facilitate maintaining this unlocked swiveling relation of the frames, means such as a latch hook 114 may be mounted on the handle end portion of the lever 112 for latching engagement with the frame 79 until swiveling reorientation of the wheel has been effected, where one person without assistance must accomplish the swiveling action.

It may be observed that by virtue of the raising separation capability of the main frame relative to the wheel, any clogging of any of the cog holes 84 will not jam the cog wheel because thereby the cog wheel can ride over the clogging obstruction, merely lifting the main frame sufficiently to enable riding of the cog or cogs over the obstructed holes. Since the wheel is held by the coupling pin 100 against turning out of its in-line, driven orientation movement of the wheel out of cogging alignment even should the locking pins 110 be released is entirely avoided.

Another modification is depicted in FIGURES 10–13, which provides a wheel irrigation device 115 in some respects similar to the unit 15′ which has just been described, but embodying a different type of drive for the supporting and traction wheels and disclosing the addition of supplementary sprinkler outrigger means to replace drag lines often used in this type of irrigation system. Similarly as in the other forms of the invention described, the unit 115 includes a top or main frame 117 and a pair of supporting wheels 118 rotatable mounted in sub-frames respectively swivelly attached to the opposite end portions of the elongated quadrangular main frame.

Support for an irrigation water pipe 119 transversely over the center of the main frame 115 is afforded by a pair of coaxially aligned, generally cantilever, tubular saddle-type clamps 120 having adjacent spaced apart end portions secured in generally cantilever fashion to the tops of respective vertical riser bars 121 which are telescopically supported in vertical fixed channel guide bars 122 affording center posts secured to respective longitudinal side frame bars 123 of the main frame and projecting to a limited extent above said main frame and to a major extent below the main frame. For vertical adjustments of the riser bars 121 to accommodate the height of the water pipe 119 to the crop being irrigated, respective vertical series of alignable bolt holes 124 are provided in the bars 121 and 122. Upper and lower respective bolts 125 secure the riser bars in the adjusted position. The lower of these bolts 125 may also be utilized to secure the lower ends of diagonal brace bars 127 extending upwardly to support the outer end portions of the clamps 120.

Sub-frames for the wheels 118 are shown as of similar construction to the sub-frames for the unit 15′. Each sub-frame comprises a horizontal spreader and journal frame 128 of elongated form having a spreader tip 129 at one end and a coupling yoke 130 at the opposite end carrying a clevis-like coupling member 131 provided with flanges arranged to be interleaved with a complementary flanged bar coupling member 132 carried by the lower end portions of the vertical center post frame bars 122. A releasable coupling pin 133 secures the members 131 and 132 in coupled relation. An axle 134 rotatably mounts each of the respective wheels within the spreader frames.

Driving of the wheels 118 in unison is effected by separable means comprising respective driving worms 135 corotatably mounted on a shaft 137 which extends longitudinally centrally under the main frame 117 and is journaled in pillow block journal assemblies 138 mounted on the underside of the main frame. Through this arrangement, the main frame 117 is supported directly on the wheels 118 through the driving worms 135 which bear against the top of the perimeter of the band tread tire of the associated wheel with the driving volute of the worm engaging in a continuous circumferential series of worm slots 139 centrally in the rim band. There is thus established a good driving connection between the respective worms 135 and the wheels 118.

Power for driving the worm shaft 137 is supplied from a suitable source such as a motor (not shown) carried by one of the units 115 of a series in a pipe-supporting system, through means such as a sprocket wheel 140 carried corotatably by the shaft 137 and coupled by the sprocket chain 141 with a driving sprocket 142 carried on a shaft 143 journaled in a bearing 144 mounted on a cross beam 145 secured between the upper end portions of the frame bars 122. The sprocket wheel 142 is mounted on one end of the shaft 143, and a double sprocket wheel 147 is mounted on the opposite end of the shaft 143 and is adapted to have coupling drive chains trained thereover and also trained over corresponding sprocket wheels on adjacently companion wheel units of the system. Each of the wheels 118 is provided with traction lugs 148.

A swivel connection between the main frame 117 and the wheel sub-frames is provided in each instance by means comprising a horizontal swivel frame plate 148 mounted in chordal relation to the upper sector of the associated wheel sub-frame structure comprising, at each side of the spreader frame a vertical frame bar 149, diagonal convergent brace bars 150 and gusset plates 151 secured between the brace bars 150 and the bottom of the swivel plate. Clearance for the wheel sector through the swivel plate 148 is afforded by an opening 153 in the plate. Extending upwardly rigidly from the plate 148 are swivel traverse pins 154 comprising a pair, one of which is located at each side of the associated driving worm 135 and relatively offset longitudinally of the swivel plate to project in connecting and swivel relation through respective arcuate guide slots 155 in a fixed swivel plate 157 secured to the underside of the main frame 117. At their opposite ends the complementary guide slots 155 provide stops for the swivel traverse pins 154 limiting swiveling traverse movement of the respective wheel sub-frame to the in-line position shown in full outline in FIGURES 10 and 12 or to the opposite limit wherein the wheel is aligned parallel to the length of the irrigation pipe 119, as shown in broken lines in FIGURES 10 and 12.

In order to separate the driving worm 135 from the associated wheel 118 for swiveling orientation of the wheel, suitable means are provided for relatively rockably raising the main frame 117 away from the wheel. Such means may comprise a lever device 158 pivotally attached at 159 to the main frame and in such overlying relation to the tops of the swivel guide pins 154 that when the lever device is depressed, the frame 117 is lifted to the proper height by downward pressures against the tops of the pins.

To retain the wheel sub-frame in parallel relation to the length of the pipe 119 suitable interlock means are provided, herein comprising a pair of worm saddles 160 mounted on the longitudinal margins of the swivel plate 148 and providing aligned worm-receiving upwardly opening worm-receiving saddle depressions 161 in which the associated worm 135 rests and thus interlocks the sub-frame in the non-driving parallel wheel relation when it is desired to transport the pipe 119 in the direction of its length. By reverse action, the worms are adapted to be lifted from the saddles 160 and the wheels swivel in return to the in-line position with the worms then returned to the driving relation to the wheels and the sub-frame coupled to the center post through the coupling pins 133.

Means may be provided for extending the area of irrigation coverage without the use of drag lines, which are a nuisance when the wheeled system is to be reversed or to be transported in the direction of the length of the pipe since then the drag lines must be disconnected. In a desirable arrangement, outrigger pipes 162 are extended laterally from the water pipe 119 and carried by the wheeled units of the mobile system (FIGS. 10, 11 and 13). To this end, the outrigger pipes are of a suitable small diameter but large enough to be self-sustaining.

They are coupled in communication with the pipe 119 through a suitable juncture or union 163 which may form part of a sprinkler head assembly 164 extending upwardly from the pipe 119 between the supporting clamps 120. At least at their outer ends, and if desired at intermediate points, the outrigger pipes 162 are provided with sprinkler heads 165.

Additional support for the outrigger pipes 162 is provided and cantilever stresses are relieved by upwardly extending supporting posts 167 mounted on the opposite ends of the main frame 117. Means such as vertically adjustable connectors 168 secure the outrigger pipes to the supporting posts 167 in any vertically adjusted position of the pipe 119. Guy wires extend from the tops of the posts 167 into supporting relation to the outer end portions of the outrigger pipes. In addition, stabilizing guy wires 170 are desirably connected between the outer end portions of the outrigger pipes 162 and the water pipe 119, substantially as shown in FIGURE 13. Further, to enable relatively long projection of the outrigger sprinkler pipes 162 beyond the opposite ends of the wheeled frame, supporting ground wheel or roller devices 171 may be attached to the outrigger pipes.

Although the outrigger irrigation pipe extensions are disclosed as mounted on the unit 115, similar mounting may be effected with respect to the other forms of the mobile units described, or on other similar units, as may be convenient or desired in the transportation of the main water pipe.

It will be understood that modifications and variations may be effected without departing from the scope of the novel concepts of the present invention.

I claim as my invention:

1. A mobile irrigation device of the character described comprising:
    a main frame structure having means thereon for supporting an irrigation water pipe,
    a supporting wheel,
    a sub-frame rotatably mounting said wheel,
    separable means carried in part on the main frame to drive the wheel rotatably for advancing the device along one axis of movement,
    means swively connecting the sub-frame to the main frame for relative swiveling and limited separating movements to enable turning of the sub-frame and the wheel from said one axis of movement into a second axis of movement,
    said separable drive means separating incident to said separating movement of the sub-frame to effect a disconnection of the drive means to enable swiveling movement of the wheel and sub-frame relative to the main frame, and
    releasable means for maintaining said sub-frame in the orientation for movement along either said one axis or along said second axis.

2. A mobile irrigation device of the character described comprising:
    a main frame structure having means thereon for supporting an irrigation water pipe,
    a supporting wheel,
    a sub-frame rotatably mounting said wheel,
    separable means carried in part on the main frame to drive the wheel rotatably for advancing the device along one axis of movement,
    means swively connecting the sub-frame to the main frame for relative swiveling and limited separating movement to enable turning of the sub-frame and the wheel from said one axis of movement into a second axis of movement,
    said separable drive means separating incident to said separating movement of the sub-frame to effect a disconnection of the drive means to enable swiveling movement of the wheel and sub-frame relative to the main frame,
    releasable coupling means maintaining said sub-frame in the orientation for movement along said one axis, and
    releasable interlock means associated with said swivel connection means for retaining the sub-frame oriented for said movement along said second axis.

3. A mobile irrigation device of the character described comprising:
    a main frame structure having means thereon for supporting an irrigation water pipe,
    a supporting wheel,
    a sub-frame rotatably mounting said wheel,
    means connecting said sub-frame to said main frame for relative swiveling and limited separating movement,
    means for driving said wheel comprising a driving member mounted on the main frame and cooperating driving means on the wheel coactive to drive the wheel rotatably in one swivelled orientation of the sub-frame relative to the main frame,
    releasable means maintaining the sub-frame in said one orientation,
    said sub-frame being swively movable into a second orientation and said driving means on the wheel being separable from said driving member by separating movement of the sub-frame relative to the main frame, and
    releasable means for maintaining the sub-frame in said second orientation.

4. In combination in an irrigation device of the character described,
    an elongated main frame structure having means thereon for supporting an irrigation water pipe having its length horizontally transverse to said main frame,
    a pair of supporting wheels,
    respective sub-frames rotatably mounting said wheels,
    releasable means swively connecting said sub-frames respectively under the opposite end portions of said main frame,
    said connecting means permitting limited separating movement of the sub-frames relative to the main frame incident to swiveling of the sub-frames,
    separable driving means on the main frame and on the wheels operable to drive the wheels in unison when the sub-frames and wheels are aligned in a plane across the axis of the length of the supported pipe,
    means separably coupling said sub-frames in the in-line relationship,
    said driving means being separable on swiveling the sub-frames into respective planes parallel to the direction of the axis of the supported pipe, and
    means for releasably retaining the sub-frames in said parallel plane.

5. An irrigation device as defined in claim 4, in which each of said sub-frames has coupling means thereon at one end for coupling the frames in the in-line relationship and includes a crop spreader frame structure having a generally spear head shaped spreader nose at the opposite end of the sub-frame.

6. In combination in a mobile irrigation device of the character described,
    an upper main frame structure having means theron for supporting an irrigation water pipe,
    a pair of supporting wheels, a respective sub-frame rotatably mounting each of said wheels,
    each of said sub-frames including a bolster having an upwardly extending pintle rigid thereon,
    said main frame having respective bearing sleeves receptive of said pintle and thereby swively connecting the sub-frames to the main frame,
    separable driving means on the main frame and on the wheels connected for driving the wheels in one swivelled orientation of the sub-frames, said driving means being automatically disconnected in another swivelled orientation of the sub-frames relative to the main frame, and means releasably maintaining the sub-frames in either of said orientations.

7. An irrigation device as defined in claim 6, in which said sub-frames have end portions which are joined in one of said orientations and said retaining means comprise coupling structure releasably connecting said joined portions.

8. An irrigation device as defined in claim 6, in which said main frame has structure extending downwardly between said sub-frames, and each of the sub-frames and said downwardly extending structure have coupling structure comprising the means for retaining the sub-frames releasably in one of said orientations.

9. An irrigation device as defined in claim 6, in which said releasable retaining means comprise interlock structure on said bolster and on said main frame.

10. In combination in a mobile irrigation device of the character described, an elongated horizontal main frame, a pair of supporting wheels, a respective sub-frame rotatably mounting each of said wheels, means connecting one of said sub-frames under each respective end portion of said main frame and including swivel connecting means and means affording limited relative rocking separation of the main frame and the sub-frames, driving means mounted in fixed relation on the main frame, said wheels having tire treads and means on the tire treads drivingly coactive with said driving means in one orientation of the sub-frames relative to the main frame and being separable from the driving means by relative rocking separation of the main frame and sub-frames and swiveling of the sub-frames into a different orientation.

11. A mobile irrigation device of the character described comprising:

an elongated horizontal main frame, wheel assemblies for supporting said main frame at a substantial elevation and each including a wheel and a sub-frame rotatably mounting said wheel, means swivelly and hingedly connecting each of said sub-frames to a respective end portion of the main frame, driving means including a cog wheel mounted in a fixed position on said main frame between said sub-frames, said wheels having respective tire treads provided with circumferential series of cog holes drivingly engageable with the cogs on the cog wheel when the wheels are in an in-line plane, said sub-frames having portions thereof interengageable in the in-line relation of the wheels, means separably coupling said portions of the sub-frames, said sub-frames being adapted to be uncoupled and hingedly moved to separate the wheels from the cog wheel and being adapted to be swivelled into parallel running relation, and means on the sub-frames and on the main frame for releasably retaining the sub-frames in the parallel running relation of the wheels.

12. In combination in a mobile irrigation device of the character described, a horizontal elongated main frame, means on said main frame for supporting a water pipe transversely to the main frame, respective wheel assemblies under each end portion of the main frame and each comprising a sub-frame and a wheel rotatably mounted therein, means swivelly connecting each of the sub-frames to the main frame, means releasably coupling the sub-frames to the main frame with the wheels in an in-line running relationship, driving means on the main frame comprising a cog wheel drivingly supported adjacent to each of said wheels, each of the wheels having a tread provided with cog wheel openings engaged by the cogs of the respective cog wheel in the in-line running relationship of the wheels, and means for effecting separation of the cog wheel relative to the wheels when said coupling means are disconnected whereby to enable swiveling reorientation of the sub-frame to dispose the wheels in running relation parallel to the supported pipe.

13. A mobile irrigation device of the character described comprising:

a main frame structure having means thereon for supporting an irrigation water pipe, wheeled assemblies comprising respective sub-frames each rotatably mounting a wheel, means swivelly connecting each of said sub-frames under a respective end portion of the main frame, each of said wheels having a tire tread with cog wheel openings, means for driving the wheels comprising respective cog wheels mounted on the main frame and engaging said tire treads by means of said cog wheel openings, and means for raising said main frame relative to said sub-frames to release the cog wheels from the tire treads to enable swivelling movements of the sub-frame relative to the main frame.

14. A mobile irrigation device as defined in claim 13, in which said means for raising the main frame comprise upwardly projecting members on the sub-frames and manually operable lever devices carried by the main frame and leverable against said upwardly projecting members.

15. A mobile irrigation device of the character described comprising:

a main frame, supporting wheels and sub-frame structure rotatably mounting said wheels, each of the wheels having a tire tread with a circumferential series of openings intermediate its width, a respective driving member for each of the wheels carried by the main frame and drivingly engageable in said openings, and means connecting the main frame to the sub-frames and permitting upward displacement of the main frame relative to the sub-frame for avoiding jamming of the driving members and the respective wheels when any of said holes are clogged.

16. A mobile irrigation device of the character described comprising:

an elongated main frame having means thereon for supporting an irrigation water pipe, a supporting wheel, a sub-frame rotatably mounting said wheel, said wheel having a tire tread with worm slot apertures in circumferential series therein, a driving worm mounted on said main frame and resting on said tread in meshing relation to said worm slot apertures and thereby supporting the main frame on the wheel, and means coupling the sub-frame and the main frame together.

17. A mobile irrigation device of the character described comprising:

an elongated main frame having means thereon for supporting an irrigation water pipe, a supporting wheel, a sub-frame rotatably mounting said wheel, said wheel having a tire tread with worm slot apertures in circumferential series therein, a driving worm mounted on said main frame and resting on said tread in meshing relation to said worm slot apertures and thereby supporting the main frame on the wheel, means swivelly connecting said sub-frame to the main frame and permitting elevation of the main frame relative to the wheel for disconnecting the worm from the wheel tread to enable swivelling reorientation of the wheel, and means on the sub-frame engageable with the worm to maintain the wheel in a running relation free from the worm.

References Cited

UNITED STATES PATENTS

| | | | |
|---|---|---|---|
| 1,139,622 | 5/1915 | Yordi | 180—31 |
| 1,601,199 | 9/1926 | Clapper | 239—213 |
| 3,094,283 | 6/1963 | Purtell | 239—213 X |
| 3,163,361 | 12/1964 | Stout | 239—212 |
| 3,166,089 | 1/1965 | Wagner | 137—344 |
| 3,245,595 | 4/1966 | Purtell | 239—212 |
| 3,245,608 | 4/1966 | Purtell | 239—212 |

M. HENSON WOOD, JR., *Primary Examiner.*

VAN C. WILKS, *Assistant Examiner.*